March 3, 1970     R. E. SHELDON     3,498,634
MANUALLY SELF-PROPELLED RIDING VEHICLE
Filed Jan. 26, 1968
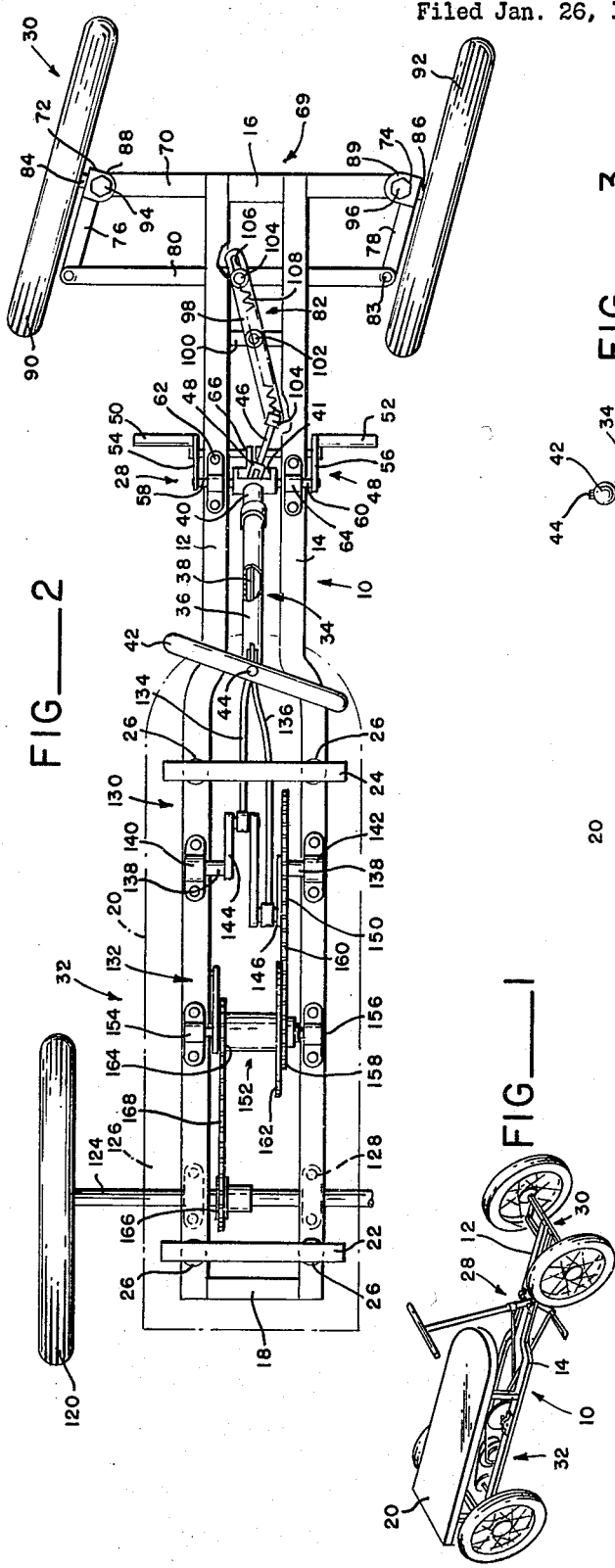
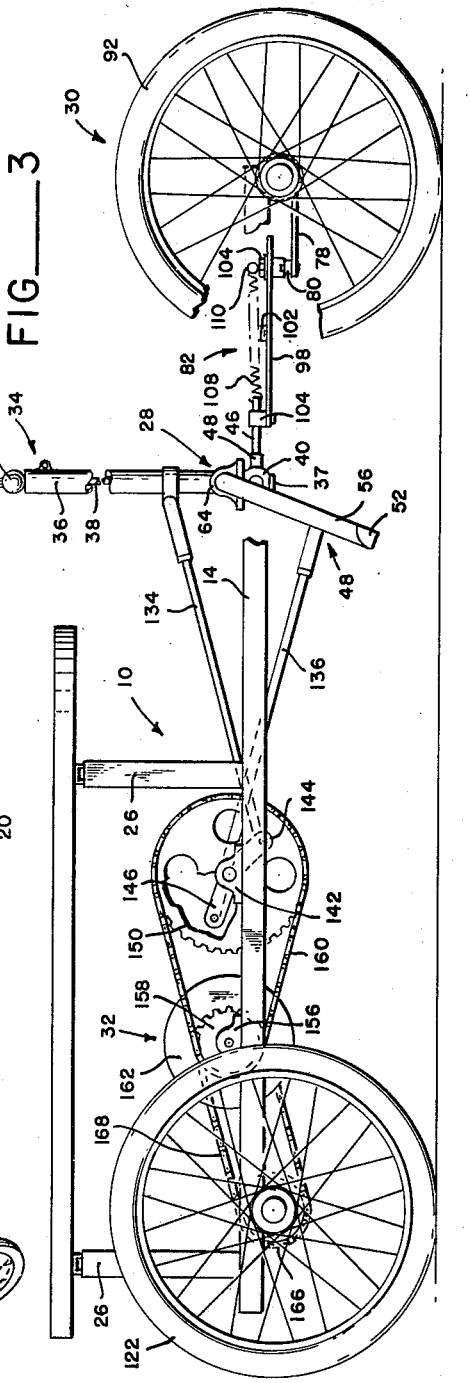
INVENTOR.
ROY E. SHELDON
BY *Seed, Berry Downs*
ATTORNEYS

United States Patent Office 3,498,634
Patented Mar. 3, 1970

3,498,634
MANUALLY SELF-PROPELLED
RIDING VEHICLE
Roy E. Sheldon, P.O. Box 266,
Ocean Park, Wash. 98640
Filed Jan. 26, 1968, Ser. No. 700,821
Int. Cl. B62m 1/12
U.S. Cl. 280—212     8 Claims

ABSTRACT OF THE DISCLOSURE

A drawbar-actuated type of vehicle is propelled and steered by a hand-operated drawbar assembly and further propelled by a foot-operated drawbar assembly. The reciprocatory movement of the two drawbar assemblies actuates a crank assembly in an additive manner to propel the vehicle.

---

This invention relates to manually self-propelled riding vehicles of the type propelled by manually reciprocating a drawbar.

Vehicles of the above-described class are commonly constructed as children's riding toys called "go-carts" but the mechanisms involved are sometimes applicable to other types of vehicles. Vehicles of the above-described type commonly experience one or more of a number of operational difficulties. One such difficulty is the inability to simultaneously reciprocate the drawbar by hand for vehicle movement and steer the vehicle by hand. In such cases, the vehicle propulsion and steering are functions performed either by separate mechanisms (as by a hand operated propulsion mechanism and a foot operated steering mechanism) or by one mechanism in an inefficient manner (as by a hand operated mechanism wherein propulsion and steering cannot be performed simultaneously because of the complexity of the propulsion or steering components of the mechanism). In both instances these mechanisms are unsuitable for applications to vehicles such as wheel chairs designed for mechanical hand operation.

Another difficulty is the inability to impart sufficient power to the vehicle to propel it at high enough speeds to interest older children, in the case where the vehicle is constructed as a "go-cart." This is usually attributable either to the drive mechanism or to the steering mechanism. In the first instance, although the vehicle drive mechanism may be designed for both hand and foot operation, the two are so interrelated that the thrust imparted is complementary rather than additive or cumulative. In the second instance, the steering mechanism and the vehicle's stability are so interrelated that the vehicle is rendered unstable when cornering at relatively high speeds.

A primary object of this invention is to provide a drawbar-propelled vehicle wherein propulsion and steering can be simultaneously effected by hand actuation of the drawbar assembly. Another object is to provide a drawbar-propelled vehicle wherein hand (arm) and foot (leg) actuation has an additive or cumulative effect in the drive assembly to propel the vehicle at higher speeds. A further object is to provide such a vehicle with an improved steering assembly whereby relatively high speed cornering does not disrupt the stability of the vehicle. Still another object is to provide a steering and drive mechanism for a drawbar-propelled vehicle that is suitable for a number of diverse applications including "go-carts" and wheelchairs.

These and other objects and advantages will become apparent from the following description and the accompanying sheet of drawings, in which:

FIG. 1 is a perspective view of a "go-cart" embodiment of the present invention;

FIG. 2 is a top plan view of the FIG. 1 embodiment; and

FIG. 3 is a side elevation view of the FIG. 1 embodiment.

In brief, this invention comprises a steerable, manual drive vehicle of the drawbar-propelled type. It has a main frame upon which is mounted the operator's seat or chair, a steering and drive actuating assembly including a hand-operated drawbar mechanism, a steerable wheel assembly, and a drive wheel assembly.

The steering and drive actuating means, or assembly, comprises hand-operated drawbar means that is pivotally mounted to the main frame for forward and rearward pivotal movement about a horizontal axis, and that is also adapted to be rotated about its longitudinal axis. This assembly also may include a foot-operated drawbar pivotally that is mounted to the main frame independently of the hand-operated drawbar means for forward and rearward pivotal movement.

The steerable wheel assembly comprises a pair of steering wheels mounted to the main frame and interconnected for parallel steering (turning). Such interconnection includes a pivotal mounting for each steering wheel, and means interconnecting the pivotal mountings adapted to be shifted transversely of the main frame to effect turning of the steering wheels in unison. This assembly also includes linkage connecting the hand operated drawbar means to the pivotal mounting interconnecting means such that rotation of the hand operated drawbar means about its longitudinal axis will effect turning of the steering wheels.

The drive wheel assembly comprises at least one drive wheel, and preferably two, rotatably mounted to the main frame, means for translating reciprocatory motion into rotary or circular motion, drive means interconnecting the motion translating means and the drive wheel, or wheels, to rotate the drive wheel, or wheels, responsive to actuation of the motion translating means. This assembly also includes actuating means such that forward and rearward pivotal movement of the latter will effect actuation of the motion translating means. When the vehicle includes a foot operated drawbar means, additional actuating means is included to link the motion translating means to the foot operated drawbar means to additively or cumulatively effect actuation of the motion translating means.

Referring now to the figures the preferred embodiment depicted, a "go-cart," comprises a main frame 10, a constructed of a pair of side frame members 12 and 14 spaced apart at their forward and rearward ends by cross members 16 and 18 so as to provide the necessary frame rigidity. An operator's seat 20 is supported on cross bars 22 and 24, in turn supported from the main frame by four vertical uprights 26 positioned two on each side frame member as shown. For appearance sake, a streamlined body (not shown) would enclose and be supported by the main frame 10. The vehicle also comprises a steering and drive actuating assembly 28 located forwardly of the seat 20 and mounted by the main frame, a steerable wheel assembly 30 mounted by the main frame at the forward end section of the vehicle, and a drive wheel assembly 32 mounted by the main frame at the rearward end section of the vehicle.

In the following description, the word "drawbar" as employed pertains to elements operated in push-pull fashion, by hand or by foot as the case may be, to effect propulsion of the vehicle. Also, the phrases "hand operated" and "foot operated" as applied to the drawbar elements are employed broadly to include the thrusting push-pull actions of the operator's arms and legs, respectively.

The steering and drive actuating assembly 28 comprises a hand operated drawbar means 34 provided in the form of a pull-push tubular drive member 36 and a steering rod member 38. The drive member 36 is connected rigidly to a hollow connector 40 at is lower end, from the end of which stub shafts extend outward transversely of the main frame into bearing pillow blocks (not shown) mounted on the underside of the side frame members 12 and 14. As thus mounted, the drive member 36 is pivotally movable forwardly and rearwardly relative to the main frame 10. The steering column or rod member 38 extends axially through the drive member 36 and is rotatably journalled therein top and bottom. The protruding upper end of the steering rod member is provided with a steering handle 42 attached thereby by a bolt 44. The protruding lower end of the steering rod member terminates within the connector 40. A steering arm 46 is provided with a yoke hinge 48 on its rearward end that extends through a semicylindrical forwardly-opening slot 41 in the connector 40 and straddles the lower end of the steering rod member. The yoke arms are hingably connected to the steering rod member by a pin or the like such that, regardless of the forward or rearward orientation of the steering rod member, the steering arm 46 will extend forward in a proper steering position. The steering rod member is secured against longitudinal movement relative to drive member 36 by being bolted to the connector 40 as at 37.

The steering and drive actuating assembly 28 also includes foot operated drawbar means 48 provided in the form of left foot and right foot peddles, 50 and 52 respectively, each extending outwardly from lever members, 54 and 56 respectively, that depend from stub shafts, 58 and 60 respectively, pivotally mounted in bearing pillow blocks, 62 and 64 respectively, positioned on top of the side frame members 12 and 14. The lever members 54 and 56 are cross connected by a cross bar 66 so that the peddles will swing about the pivotal connections 62–64 in unison.

The steerable wheel assembly 50 comprises a parallel steering mechanism 69 including a non-rotatable axle 70 mounted perpendicular to and by the main frame 10, steering knuckles 72 and 74 mounted on each end of the axle 70, tie rod arms 76 and 78 each connected to and extending rearwardly of one of the steering knuckles and a tie rod 80 pivotally connected at its ends to the rearward ends of the tie rod arms as at 81 and 83. The assembly 30 also comprises a steering linkage 82 that connects the mechanism 69 to the steering arm 46 of the steering and drive actuating assembly 28. The steering knuckles each comprise a stub shaft 84–86 which extend from pivotal supports 88–89 and rotatably mount the front steering wheels 90–92, and king pins 94–96 which pivotally connect the steering knuckles to the front axle 70. The tie rod arms rigidly connect to the supports 88–90 as shown. The front wheels are preferably mounted by the steering knuckles with a slight camber to facilitate self-centering. The steering linkage 82 comprises a bar member 98 pivotally mounted at its midpont to a main frame cross bar 100 by bolt 102, a slider connector 104 mounted on the rearward end of bar member 98 and slidably containing the forward end of the steering arm 46, a positioning bolt 104 extending through a longitudinally elongated slot 106 in bar member 98 and threadedly connected to the tie rod 80 at the latter's midpoint, and a centering coil spring 108 connected to the end of steering arm 46 and to a ring 110 mounted atop the positioning bolt 104.

The drive wheel assembly 32 comprises a pair of rear wheels 120–122 mounted at opposite ends of a rear axle 124 rotatably mounted to the main frame by bearing pillow blocks 126–128, means 130 for translating reciprocatory motion into rotary motion, drive means 132, and means 134–136 pivotally linking the motion translating means 130 to, respectively, the drive member 36 of the hand operated drawbar means 34 and the cross bar 66 of the foot operated drawbar means 48.

The motion translating means 130 comprises a crank shaft 138 in the form of stub shafts that are respectively journal mounted to the main frame by bearing pillow blocks 140–142, and crank arms 144 and 146. As shown in FIG. 2, crank arm 144 leads crank arm 146 by more than 180° and is connected by linking means 134 (in the form of an actuating connecting rod) to drive member 36. Crank arm 146 is connected by linking means 136 (in the form of another actuating connecting rod) to cross bar 66. The two actuating connecting rods 134–136 are pivotally connected to their respective interconnected elements as shown, rod 134 extending generally upward to its pivotal connection to the drive member 36 and rod 136 extending generally downward to its pivotal connection to the cross bar 66. The relative positioning of the crank arms 144–146 is such that propelling thrust applied to means 130 simultaneously by the hand operated drawbar means and the foot operated drawbar means cannot lock the drive mechanism; that is to say, when the crank arm 144 is aligned with its actuating connecting rod 134, crank arm 146 will not be aligned with its actuating connecting rod 136, and vise versa. The relative positioning of the crank arms 144–146 also is such that on initiation of the primary half of the power thrust cycle, namely when the operator's arms are pulling and his legs are pushing, the crank arm 144 will be driven (pushed) toward its bottom-dead-center position and the crank arm 146 will be driven (pulled) toward its top-dead-center position.

The drive means 132 comprises a first sprocket gear 150 connected to and rotated by the right hand stub of the crank shaft 138, a brake assembly 152 of the type called in the art a "coaster brake" journal mounted on the main frame by bearing pillow blocks 154–156, a second spocket gear 158 connected to the inner or hub mechanism of the coaster brake and divingly connected to the first gear 150 by a first drive chain 160, a fly wheel 162 mounted for rotation with the second gear 158, a third sprocket gear 164 connected to the outer shell of the coaster brake for rotation therewith, a fourth sprocket gear 166 connected to the rear axle 124 for rotation therewith and drivingly connected to the third gear 164 by a second drive chain 168.

To operate the vehicle, an operator places his feet on the peddles 50–52, grasps the handle 42 and then draws the handle 42 rearwardly toward his body while simultaneously extending his legs to push the peddles 50–52 forwardly away from his body. The operator then pushes handle 42 forwardly away from his body and retracts his legs to permit the peddles 50–52 to swing rearwardly toward his body. The operator is able to apply a driving thrust with his arms in both halves of the cycle (with greater power in the first half), but is able to apply driving thrust with his legs only during the first half of the cycle. Thus, the first half of the cycle is considered the power stroke and the second half cycle merely a return stroke. To even out the power distribution to the drive means 32, the fly wheel 162 is provided.

It will be noted that the crank arms 144–146 are so oriented that the thrust imparted by the arms during the power stroke will have the greatest effect at its initiation inasmuch as the crank arm 144 will be generally perpendicular to the actuating connecting rod 134 shortly after the initiation of the power stroke. However, the thrust imparted by the legs during the power stroke will have the greatest affect at its termination inasmuch as the crank arm 146 will be generally perpendicular to the actuating connecting rod 136 just before termination of the power stroke. Thus, the driving thrust from the arms and legs is additive or cumulative during the power stroke. The result is that the vehicle is easily powered to relatively high speeds approaching speeds attainable with bicycles.

When a desired speed has been obtained, the operator sits back with the handle 42 in his lap and his legs outstretched and coasts, the coaster brake 152 disengaging the forward drive elements from the rear axle-connected rearward drive elements.

It is also to be noted that the preciseness of the steering mechanism is such that the vehicle can be easily and accurately turned at any time, whether during the power stroke, a return stroke or during coasting. When turning the vehicle, rotation of the handle 42 rotates the steering member 37 which swings the steering arm 46 about the axis of the steering member 38. This pivots the member 98 about its vertical center axis at 102, steering arm 46 sliding in slider block 104, which in turn transversely shifts the tie rod 80 of the steering mechanism to affect parallel turning of the front wheels, the member 98 being permitted to slide relative to positioning bolt 104 reason of slot 106. To return the front wheels to a centered position, little effort is required because the spring 108-elongated during turning-contacts to draw the steering linkage to center position, and because the camber of the front wheels tends to cause them to center.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

As an example, the drive chain arrangement depicted could be replaced by a gear drive where space limitations so dictate, as in the case of a wheelchair.

The embodiments of the invention in which an exclusive property or privilege is claimed are defined as follows:

1. A steerable, manual drive vehicle which comprises a main frame; steering and drive means comprising hand operated drawbar means and foot operated drawbar means mounted to said main frame for forward and rearward pivotal movement, said hand operated drawbar means being further adapted for rotation about its longitudinal axis; a steerable wheel assembly comprising at least one steerable wheel mounted to said main frame for pivotal turning movement, and means linking the steerable wheel to said hand operated drawbar means such that rotation of said hand operated drawbar means effects the turning of said steerable wheel; and a drive wheel assembly comprising at least one drive wheel rotatably mounted to said main frame, a crank assembly journaled to said main frame and including first and second crank arms, a first connecting rod pivotally connected to said first crank arm and to said hand operated drawbar means, the second connecting rod pivotally connected to said second crank arm and to said foot operated drawbar means, the first and second crank arms interrelated such that maximum driving thrust is applied to said crank assembly from each drawbar means in an additive manner, drive means interconnecting said crank assembly and said drive wheel, said hand operated drawbar means comprises a steering column; means mounting said steering column for forward and rearward pivotal movement and rotation about its longitudinal axis, a steering arm, means pivotally mounting said steering arm to said steering column such that said steering arm is operable regardless of the forward or rearward orientation of said steering column, and wherein the means linking the steerable wheel to said hand operated drawbar means comprises a self-centering link member pivotally mounted intermediate its ends to said main frame, means slidably connecting said steering arm to the rearward end section of said link, and means slidably connecting said steerable wheel to the forward end section of said link member.

2. The vehicle of claim 1 wherein the means mounting said steering column comprises a tubular drive shaft member axially enclosing and journal mounting said steering column, and a connector member journalled to said main frame for forward and rearward pivotal movement and mounting the lower end of said drive shaft member, said connector having a forwardly opening slot into which said means pivotally mounting said steering arm to said steering column extends for such connection.

3. A steerable, manual drive vehicle which comprises a main frame; steerable drive means comprising hand-operated drawbr means mounted to said main frame for forward and rearward pivotal movement and adapted for rotation about its longitudinal axis; a steerable wheel assembly comprising a pair of steerable wheels mounted to said main frame for pivotal turning movement, means interconnecting the steerable wheel mountings to effect turning of said steerable wheels in unison, and means linking the steerable wheels interconnecting means to said hand operated drawbar means such that rotation of said hand operated drawbar means effects a lateral shifting of said steerable wheel interconnecting means and the turning of said steerable wheels; and a drive wheel assembly comprising at least one drive wheel rotatably mounted to said main frame, means for translating reciprocatory motion into rotary motion, drive means interconnecting said motion translating means and said drive wheel and being resposive to actuation of said motion translating means, and first actuating means interconnecting said motion translating means and said hand operated drawbar means such that forward and rearward pivotal movement of said hand operated drawbar means effects actuation of said motion translating means, foot operated drawbr means mounted to said main frame for forward and rearward pivotal movement; second actuating means interconnecting said motion translating means and said foot operated drawbar means such that rearward pivotal movement of said foot operated drawbar means effects actuation of said motion translating means in a manner additive to said hand operated drawbar means; said motion translating means comprising a crank assembly journaled to said main frame, and including first and second crank arms; said first actuating means comprising a connecting rod pivotally connected to said first crank arm and to said hand operated drawbar means for reciprocatory movement responsive to forward and rearward movement of said hand operated drawbar means, said second actuating means comprising a connecting rod pivotally connected to said second crank arm and to said foot operated drawbar means for reciprocatory movement responsive to forward and rearward movement of said foot operated drawbar means, the first and second crank arms being interrelated such that maximum driving thrust is applied to said drive means from said drawbar means in an additive manner, wherein said drive means interconnecting said motion translating means and said drive wheel comprises a coaster brake, a first drive chain drivingly connecting said crank assembly to said coaster brake, and a second drive chain connecting said coaster brake to said drive wheel such that rotation of said crank assembly effects rotation of said drive wheel and such that non rotation of said crank assembly permits said drive wheel to free wheel.

4. A steerable, manual drive vehicle which comprises a main frame; steering and drive means comprising hand operated drawbar means and foot operated drawbar means mounted to said main frame for forward and rearward pivotal movement, said hand operated drawbar means being further adapted for rotation about its longitudinal axis; a steerable wheel assembly comprising at least one steerable wheel mounted to said main frame for pivotal turning movement, and means linking the steerable wheel to said hand operated drawbar means such that rotation of said hand operated drawbar means effects the turning of said steerable wheel, said linking means including means for pivoting said steerable wheel and a steering arm mounted to said wheel pivoting means for moving said pivoting means when said steering arm is swung laterally and for sliding relative to said pivoting means when said steering arm is pivoted forward and rearward; and a drive wheel assembly comprising at least one drive wheel rotatable mounted to said main frame, a crank assembly journaled to said main frame and including first and second crank arms, a first connecting rod pivotally connected to said first crank arm and to said hand operated drawbar means, a second connecting rod pivotally connected to said second crank arm and to said foot operated drawbar means, the first and second crank arms interrelated such that maximum driving thrust is applied to said crank assembly from each drawbar means in an additive manner, and drive means interconnecting said crank assembly and said drive wheel.

5. The vehicle of claim 4 further including a second steerable wheel mounted to said main frame, wherein said steerable wheel mountings comprise knuckle bearings pivotally mounting said steerable wheels; and including means interconnecting the steerable wheel mounting comprising tie rod arms attached to said knuckle bearings, and a tie rod pivotally interconnecting said tie rod arms.

6. The vehicle of claim 4 wherein said foot operated drawbar means comprises left and right foot peddles, means swingably mounting said foot peddles to said main frame, and means rigidly connecting said peddles together for swinging movement in unison.

7. A steerable, manual drive vehicle which comprises a main frame; steering and drive means comprising hand operated drawbar means and foot operated drawbar means mounted to said main frame for forward and rearward pivotal movement, said hand operated drawbar means being further adapted for rotation about its longitudinal axis; a steerable wheel assembly comprising at least one steerable wheel mounted to said main frame for pivotal turning movement, and means linking the steerable wheel to said hand operated drawbar means such that rotation of said hand operated drawbar means effects the turning of said steerable wheel; and a drive wheel assembly comprising at least one drive wheel rotatably mounted to said main frame, a crank assembly journaled to said main frame and including first and second crank arms, a first connecting rod pivotally connected to said first crank arm and to said hand operated drawbar means, a second connecting rod pivotally connected to said second crank arm and to said foot operated drawbar means, the first and second crank arms interrelated such that maximum driving thrust is applied to said crank assembly from each drawbar means in an additive manner, drive means interconnecting said crank assembly and said drive wheel; said drive means interconnecting said crank assembly and said drive wheel comprises a coaster brake, a first drive chain drivingly connecting said crank assembly to said coaster brake, and a second drive chain drivingly connecting said coaster brake to said drive wheel such that rotation of said crank assembly effects rotation of said drive wheel and such that non rotation of said crank assembly permits said drive wheel to free wheel.

8. A steerable, manual drive vehicle which comprises a main frame; a steerable wheel assembly comprising at least one steerable wheel mounted to said main frame for pivotal turning movement; and a drive wheel assembly comprising at least one drive wheel rotatably mounted to said main frame, a crank assembly journaled to said main frame and including first and second crank arms, means for rotating said crank arms, coaster brake means, first motion transmitting means interconnecting said crank arms and said coaster brake means, a flywheel connected to said first motion transmitting means, and second motion transmitting means interconnecting said coaster brake means and said drive wheel whereby said flywheel is rotated with said drive wheel for forward motion but is disconnected from said drive wheel during free-wheeling and braking thereof.

References Cited

UNITED STATES PATENTS

| 589,353 | 8/1897 | Jensen | 280—256 |
| 1,479,887 | 1/1924 | Bitner | 280—234 |
| 1,536,788 | 5/1925 | Grady | 280—240 |
| 1,784,419 | 12/1930 | Devito | 280—257 X |
| 2,707,112 | 4/1955 | Ludwigson et al. | 280—252 X |
| 2,815,222 | 12/1953 | Harrison | 280—261 |
| 2,884,259 | 4/1959 | Snodgrass | 280—234 |
| 3,336,047 | 8/1967 | Burgess | 280—240 |

KENETH H. BETTS, Primary Examiner

U.S. Cl. X.R.

280—234, 257, 269